US005662253A

United States Patent [19]
Goings

[11] Patent Number: 5,662,253
[45] Date of Patent: Sep. 2, 1997

[54] REMOVABLE VERTICAL SKI RACK FOR AUTOMOBILE INTERIORS

[76] Inventor: Tommy R. Goings, 249-12 Country Club Dr., Concord, N.C. 28025

[21] Appl. No.: 694,110

[22] Filed: Aug. 8, 1996

[51] Int. Cl.⁶ ..................................................... B60R 7/08
[52] U.S. Cl. .......................... 224/311; 224/546; 224/547; 224/551; 224/917.5
[58] Field of Search .................... 224/311, 545, 224/546, 548, 549, 550, 551, 567, 568, 917, 917.5, 922; 296/37.7, 37.8; 211/70.5

[56] References Cited

U.S. PATENT DOCUMENTS

| | | | |
|---|---|---|---|
| 2,302,300 | 11/1942 | Davies | 224/546 |
| 2,634,892 | 4/1953 | Wachowski | 224/551 |
| 2,721,680 | 10/1955 | Steckman | 224/922 |
| 4,271,997 | 6/1981 | Michael | 224/917.5 |
| 4,733,809 | 3/1988 | Pursell | 224/917.5 |

Primary Examiner—David J. Walczak
Assistant Examiner—Charles R. Eloshway

[57] ABSTRACT

A simple, lightweight, removable device for transporting skis safely inside an automobile. There are two assemblies, one for the front of the vehicle and one for the back. An adjustable vertical rod provides an easy, quick way to fit the device to any car. The front support presses against the roof of the automobile and the floor or console as appropriate. The length of the support is adjustable to allow it to fit different vehicles. The rear support sits on the rear deck of the vehicle. The skis are attached to adjustable shelves on the front and rear supports.

1 Claim, 3 Drawing Sheets

REMOVABLE VERTICAL SKI RACK FOR AUTOMOBILE INTERIORS

BACKGROUND OF THE INVENTION

Currently one of the fastest growing sports in the United States is skiing. This has resulted in a lot of people who own normal automobiles having to obtain a way to transport skis.

The purpose of this invention is to provide a new and innovative method to secure skis for transport inside of the common types of automobiles and recreational vehicles currently available. This type of ski rack is easily and quickly installed and uninstalled inside of the car.

DESCRIPTION OF THE PRIOR ART

The common previous way to transport skis is to mount a ski rack on the top of the car. Typically these racks are large, bulky and difficult to install. They can be heavy and the consumer must reach across the top of the vehicle which is difficult. The new trend toward sport utility vehicles makes the problem worse because they are usually tall. Very often ski racks have to be permanently mounted which a lot of people do not want to have done to their vehicles for only a winter sport item. Mounting skis on the outside of the vehicle subjects them to a lot of dirt, road salt, gravel, etc. while being transported. The gas mileage of the vehicle is often decreased with an outside rack. In addition, skis can be easily stolen from an outside rack.

There have been a few attempts to invent an interior mount for skis, but they have several problems. They usually have to be attached to the car roof either by drilling holes or using screws into some structure in the car. Also, prior inventions hang the skis from the roof which interferes with headroom and vision in the car. The old type of ski rack also takes considerable time to install and usually requires more than one person to install. Traditional types of ski racks also are often expensive to buy and install. This new type of rack is very simple to produce and should be much less expensive.

SUMMARY OF THE INVENTION

An interior mounted ski rack that is easy to install, does not require any major effort to install, and can be easily adjusted to fit several types of vehicles. It can also be removed and stored in a small space easily.

DETAILED DESCRIPTION OF THE DRAWINGS

Figure 1:
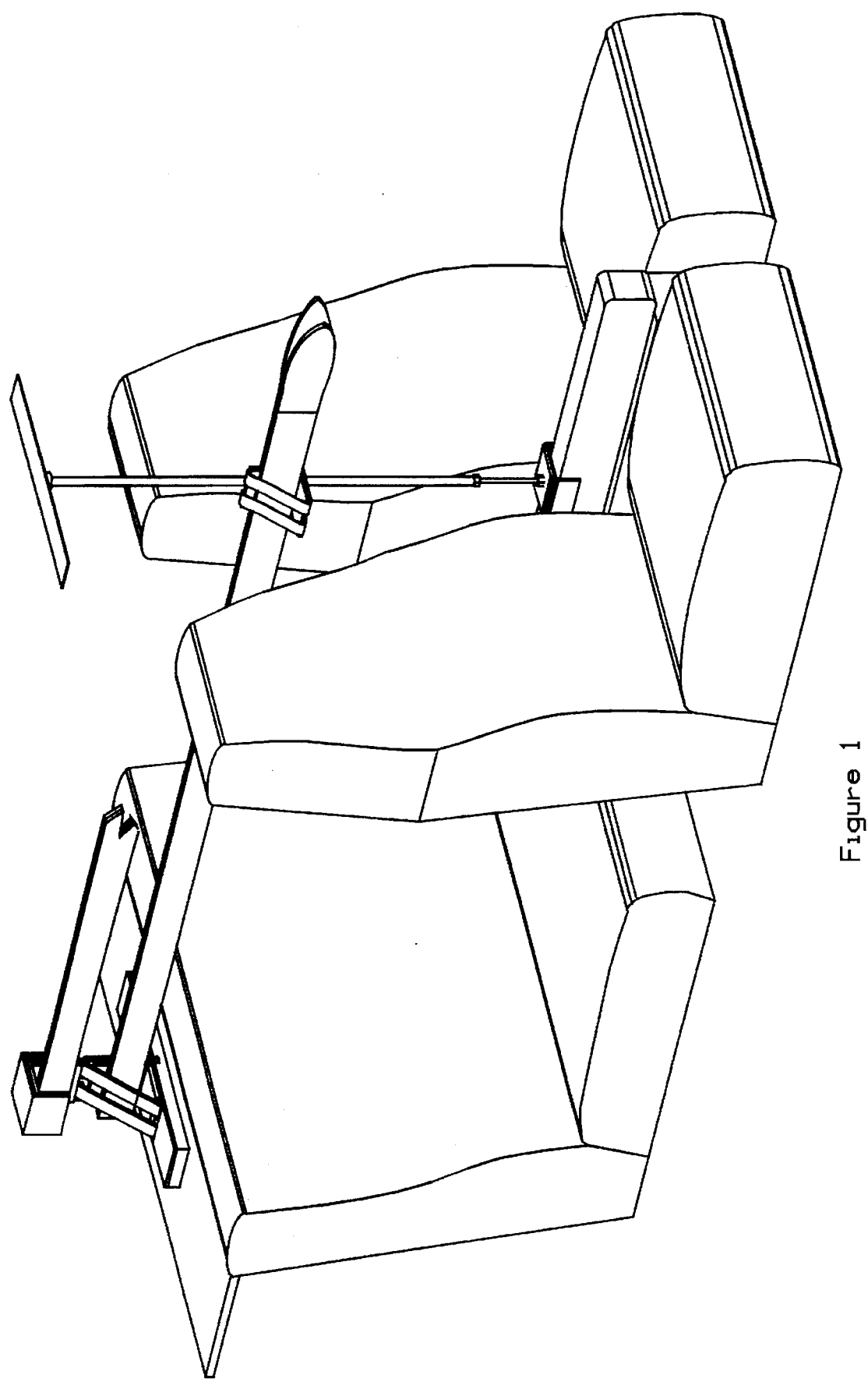
FIG. 1 is a view of the device (rack) installed in an automobile with a pair of skis installed.
Figure 2:
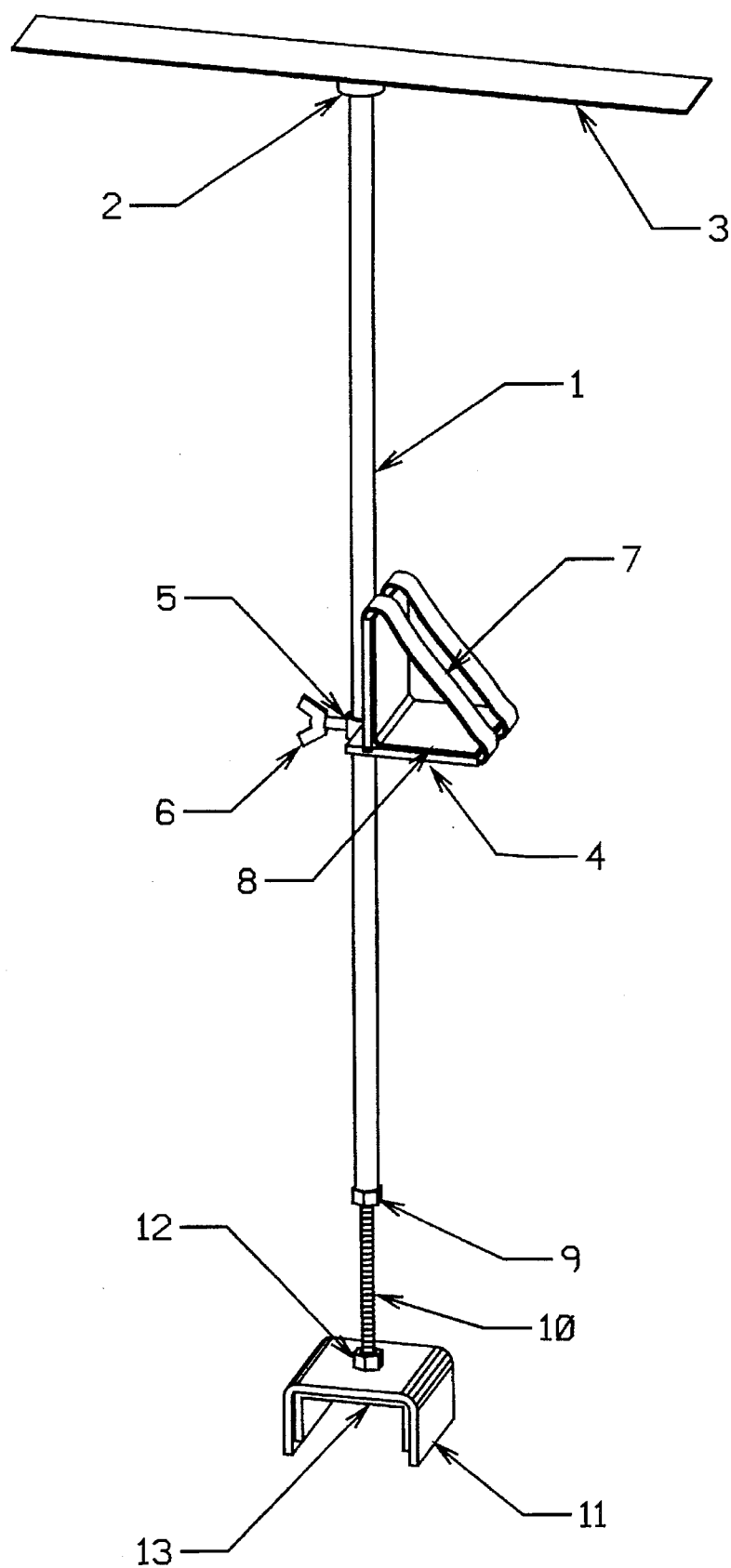
FIG. 2 is a view of the front support assembly portion of the rack.
Figure 3:
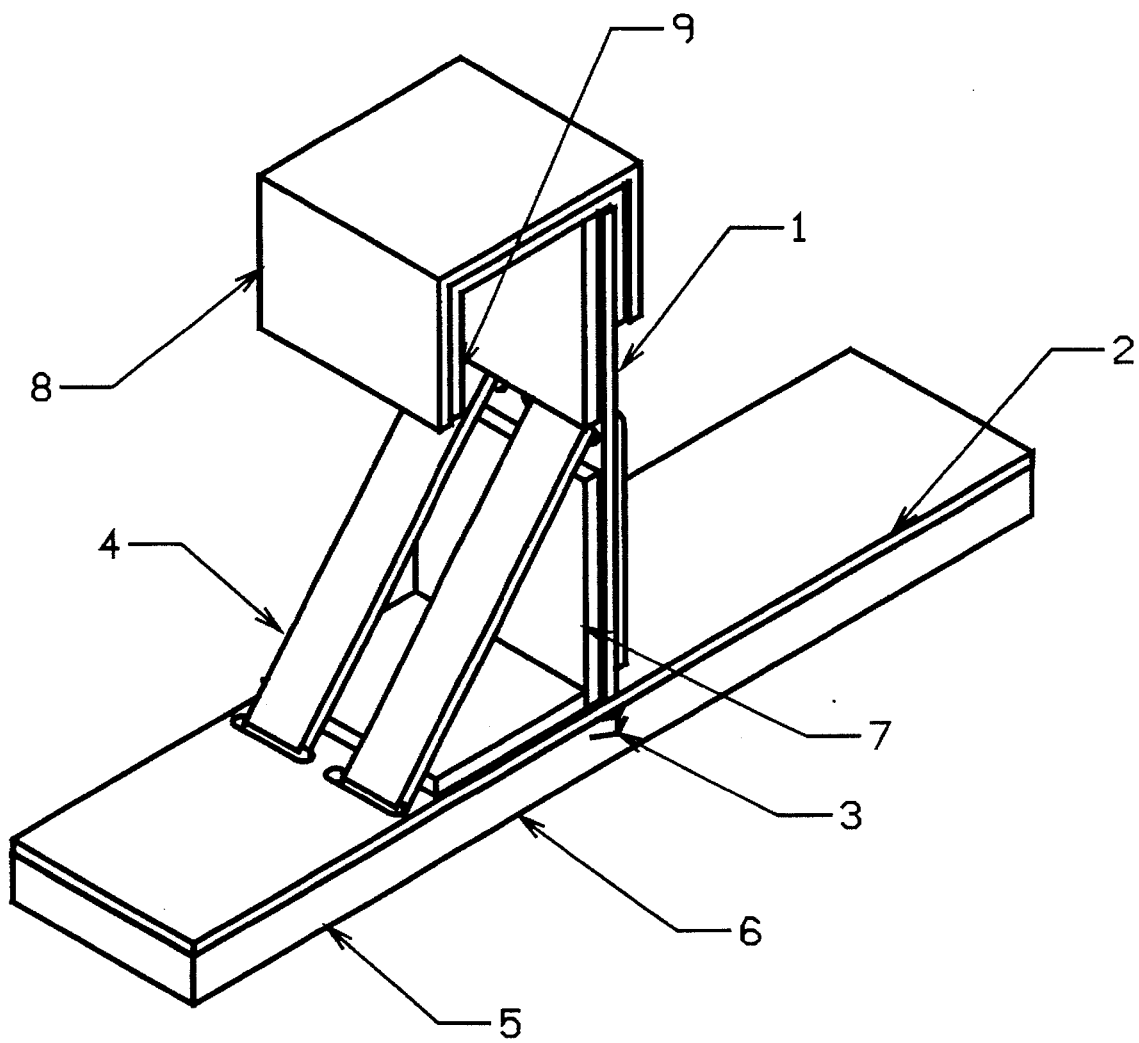
FIG. 3 is a view of the rear support assembly portion of the rack.

The ski rack includes a front support assembly shown in FIG. 2 and a rear support assembly shown in FIG. 3.

The components of the front support assembly are mounted on a steel tube 1. A second tube 2 with inside diameter larger than 1 is attached to a steel plate 3 to make the top mounting base. Two connected steel plates 4 are connected with a tube 5 with inside diameter larger than 1 to make the ski shelf. A wing-nut 6 holds the shelf onto 1 and allows the shelf to be adjusted vertically. Velcro straps 7 wrap around the shelf and hold the skis onto the shelf.

A nut 9 is welded to the bottom of tube 1. A threaded rod 10 is screwed into the nut. The threaded rod 10 is attached to the steel bottom mounting base 11 by means of a nut 12 welded onto the base 11. Padding 13 inside the base 11 protects the automobile from damage by the rack.

The rear support assembly is comprised of a vertical steel plate 1 connected to a horizontal steel plate 2 by means of nuts 3. A Velcro pile strap 4 extends through slots in both plates 3 and 4 and is used to secure the skis to the support assembly. A foam base 5 protects the automobile from damage by the rack. Foam members 6 and 7 protect the skis from damage. A separate steel clamp 8 with a foam pad 9 is used to secure a second pair of skis to the rear support assembly.

I claim:

1. A ski rack kit for holding skis in the occupant space of a car, said ski rack kit comprising:

a front support assembly adapted for placement proximate the front of the occupant space, said front support assembly comprising top and bottom mounting bases and a vertically adjustable upright member connected therebetween, said upright member being vertically adjustable to press said top and bottom mounting bases against the roof and floor of the occupant space, respectively, so as to hold the front support assembly in place;

a padded shelf attached to said upright member, said padded shelf having means for securing one end of a pair of skis thereto;

a rear support assembly adapted for placement on a rear deck of the occupant space, said rear deck being located between the rear seat of the occupant space and the rear window of the car, said rear support assembly comprising a bracket having means for releasably securing said bracket in place on said rear deck and means for securing the other end of said pair of skis thereto.

* * * * *